United States Patent
Nakano et al.

(10) Patent No.: US 7,315,391 B2
(45) Date of Patent: *Jan. 1, 2008

(54) MANAGING DIGITAL IMAGES

(75) Inventors: Brad Nakano, Chula Vista, CA (US); Gregory T. Hulan, Poway, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 935 days.

This patent is subject to a terminal disclaimer.

(21) Appl. No.: 10/350,419

(22) Filed: Jan. 24, 2003

(65) Prior Publication Data

US 2004/0145770 A1    Jul. 29, 2004

(51) Int. Cl.
*G06F 15/00* (2006.01)

(52) U.S. Cl. .............. 358/1.15; 358/1.1; 358/1.16; 358/1.18

(58) Field of Classification Search .......... 358/1.1, 358/1.2, 1.12, 1.13, 1.15, 1.16, 1.18, 402
See application file for complete search history.

(56) References Cited

U.S. PATENT DOCUMENTS

| | | | |
|---|---|---|---|
| 6,141,111 A * | 10/2000 | Kato | 358/1.15 |
| 7,009,726 B2 * | 3/2006 | Lumley | 358/1.15 |
| 2001/0052993 A1 * | 12/2001 | Lumley | 358/1.12 |
| 2002/0167497 A1 * | 11/2002 | Hoekstra et al. | 345/179 |
| 2003/0038835 A1 * | 2/2003 | DeFelice | 345/738 |
| 2004/0047001 A1 * | 3/2004 | Gehring et al. | 358/1.18 |
| 2004/0134978 A1 * | 7/2004 | Hara et al. | 235/375 |
| 2004/0145770 A1 * | 7/2004 | Nakano et al. | 358/1.15 |
| 2004/0151399 A1 * | 8/2004 | Skurdal et al. | 382/266 |
| 2005/0031190 A1 * | 2/2005 | Gann | 382/306 |
| 2005/0063012 A1 * | 3/2005 | Fujinaga | 358/1.18 |
| 2005/0185204 A1 * | 8/2005 | Shelton et al. | 358/1.13 |
| 2005/0203763 A1 * | 9/2005 | Sesek et al. | 705/1 |
| 2006/0044581 A1 * | 3/2006 | Cavill et al. | 358/1.12 |

OTHER PUBLICATIONS

Hewlett-Packared Company, HP PSC—Instant Photos From Your HP PSC 950/950xi, 2002.

* cited by examiner

*Primary Examiner*—Kimberly A. Williams

(57) ABSTRACT

Printing and archiving digital images. A method embodiment of the present invention includes identifying digital images, and generating and printing a scannable proof sheet having selectors that when marked indicate that one or more identified digital images are to be acted upon in a specified manner.

21 Claims, 4 Drawing Sheets

FIG. 4

PHOTO PROOF SHEET step 1: SELECT — To select photo(s) to print, fill in top bubble(s) underneath with a dark pen.
To select photo(s) to save to PC, fill in the bubble(s) corresponding to the directory to save to.

| | | | | |
|---|---|---|---|---|
| ○ 1 Jul 28 2001<br>IMG00001.JPG<br>○ Save to Dir 1<br>○ Save to Dir 2 | ○ 2 Jul 29 2001<br>IMG00002.JPG<br>○ Save to Dir 1<br>○ Save to Dir 2 | ○ 3 Jul 29 2001<br>IMG00003.JPG<br>○ Save to Dir 1<br>○ Save to Dir 2 | ○ 4 Jul 31 2001<br>IMG00004.JPG<br>○ Save to Dir 1<br>○ Save to Dir 2 | ○ 5 Jul 31 2001<br>IMG00005.JPG<br>○ Save to Dir 1<br>○ Save to Dir 2 |
| ○ 6 Jul 28 2001<br>IMG00006.JPG<br>○ Save to Dir 1<br>○ Save to Dir 2 | ○ 7 Jul 29 2001<br>IMG00007.JPG<br>○ Save to Dir 1<br>○ Save to Dir 2 | ○ 8 Jul 29 2001<br>IMG00008.JPG<br>○ Save to Dir 1<br>○ Save to Dir 2 | ○ 9 Jul 31 2001<br>IMG00009.JPG<br>○ Save to Dir 1<br>○ Save to Dir 2 | ○ 10 Jul 31 2001<br>IMG00010.JPG<br>○ Save to Dir 1<br>○ Save to Dir 2 |
| ○ 11 Jul 28 2001<br>IMG00011.JPG<br>○ Save to Dir 1<br>○ Save to Dir 2 | ○ 12 Jul 29 2001<br>IMG00012.JPG<br>○ Save to Dir 1<br>○ Save to Dir 2 | ○ 13 Jul 29 2001<br>IMG00013.JPG<br>○ Save to Dir 1<br>○ Save to Dir 2 | ○ 14 Jul 31 2001<br>IMG00014.JPG<br>○ Save to Dir 1<br>○ Save to Dir 2 | ○ 15 Jul 31 2001<br>IMG00015.JPG<br>○ Save to Dir 1<br>○ Save to Dir 2 | step 2: PRINT
Select print options. Select only one choice per session.

| number of prints: | image size (in.): | paper size: | borders & frames: |
|---|---|---|---|
| ○ single<br>○ double | ○ 2x3 ○<br>○ 3.5x5 ○ 4x6<br>○ 4x6  8.5x11 | ○ 4x6<br>○ 8.5x11 | ○ □  ○ none<br>○ ○ ○ □<br>○ | step 3: ARCHIVE
Select save to PC options.
Indicate which directories to save selected photos from step 1 to.
To save *all* photos to *same* directory, skip step 1, mark All column.

○ Delete all photos on camera card after printing & saving

| All | Dir 1 | Dir 2 | Directory on PC: |
|---|---|---|---|
| ○ | ○ | ○ | C:/my photos |
| ○ | ○ | ○ | C:/work photos |
| ○ | ○ | ○ | C:/shared photos | step 4: SCAN
Place sheet on scanner glass at front right corner. Press proof sheet, then 2.

MANAGING DIGITAL IMAGES

BACKGROUND

The use of digital cameras has proliferated over the past few years. Rather than using film, a digital camera stores electronic photos on a storage medium such as a memory card. There are many types of memory cards available today. Compact flash and smart media are two examples. "Compact Flash" is a registered trademark of the Sandisk Corporation while "Smart Media" is a registered trademark of the Toshiba Corporation. Sony's "Memory Stick"® and IBM's "Microdrive"® are two other examples.

To print an image stored on a memory card, software operating on a desktop computer accesses the memory card through hardware often referred to as a reader. That software then directs a printer connected to the computer to print the image. Recently, memory card readers have been integrated directly into the designs of a number of commercially available printers. Programming operating on the printer is capable of reading and printing images stored on a memory card bypassing the need for a connected computer.

Often a memory card will contain a large number of images. A user will desire to print some and not others. For example, a user may capture a number of digital images of a subject hoping to obtain one or two acceptable images. The user may only desire to print the acceptable image or images. A second user may have work-related images commingled with personal family images. The second user may desire to print the work-related images. After printing, users often desire to move digital images from a memory card to a digital album or other archive stored on a hard drive. Unwanted images are deleted from the memory card.

When a computer is used, software running on the computer can utilize the computer's color display, keyboard, and pointing devices to provide a user with a sophisticated interface for printing, archiving, and deleting digital images. Where a printer is used, the printer's programming usually does not have the luxury of a monitor, keyboard, and mouse for doing the same. As a consequence, a computer is often needed to effectively complete the combined tasks of printing, archiving, and deleting digital images.

DESCRIPTION OF THE DRAWINGS

FIG. 4 illustrates a proof sheet according to an embodiment of the present invention.

DETAILED DESCRIPTION

INTRODUCTION: Consumer use of digital cameras has proliferated over the past few years. Rather than using film, a digital camera stores electronic photos on a storage medium such as a memory card. In response, recent printer designs have integrated memory card readers and programming enabling users to print images from memory cards without the need of a connected computer.

All in one printing devices have also become quite popular. In addition to printing, these multifunction devices (MFDs) are capable of scanning, copying, and sometimes faxing documents. Various embodiments of the present invention can be incorporated into or with an MFD in order to present a user with a more sophisticated interface, enabling the user to individually select digital images to be printed, managed, and deleted.

Figure 1:
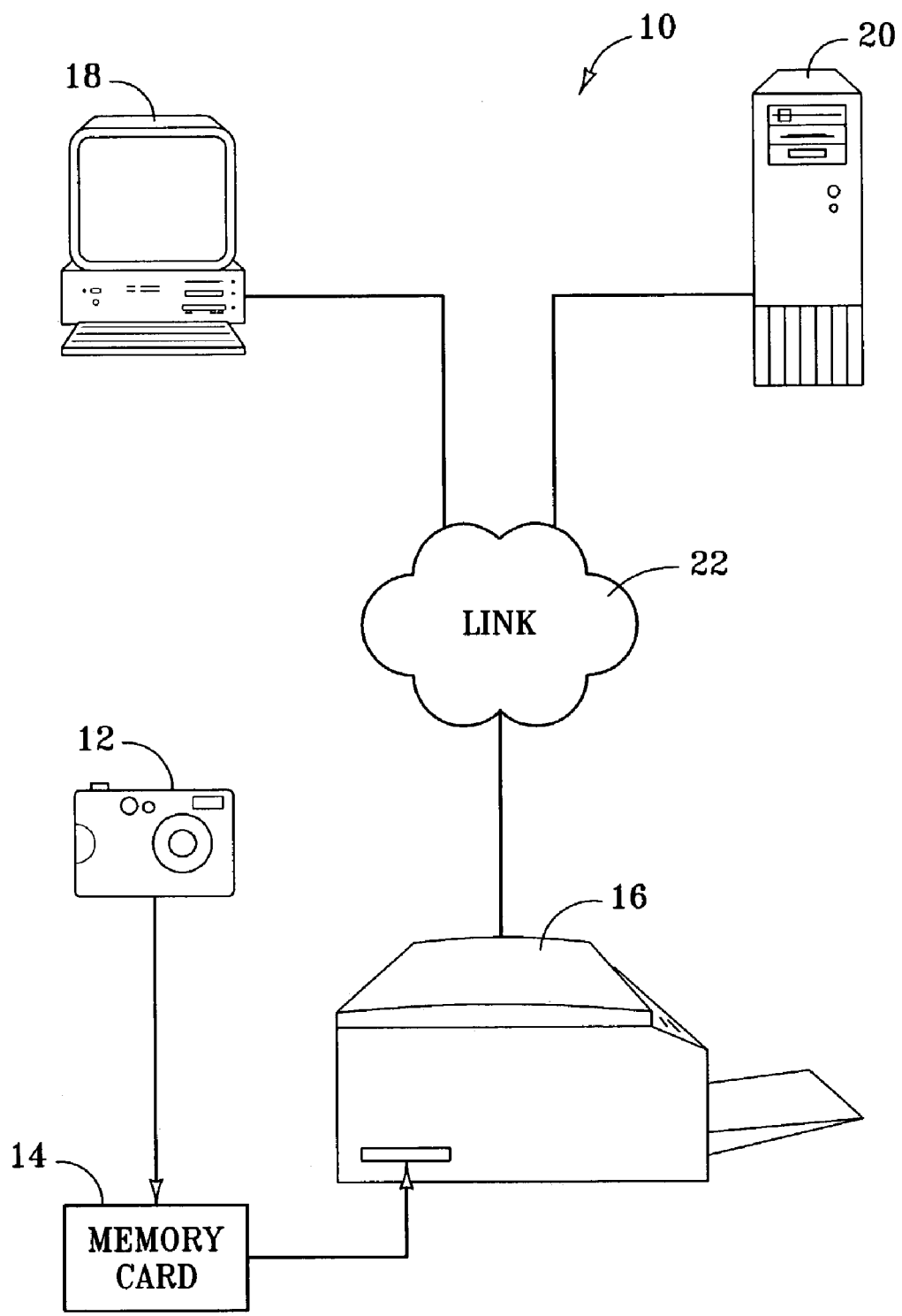
FIG. 1 is a block diagram illustrating the physical and logical components of a computing environment for printing and archiving digital images.

Various embodiments of the present invention may be implemented in the computing environment shown in FIG. 1. Environment 10 includes digital camera 12, memory card 14, MFD (Multi Function Device) 16, desktop computer 18, and server 20. Digital camera 12 represents any camera capable of storing digital images on memory card 14. Rather than being stored on film like images captured by a traditional camera, digital images are stored electronically in any number of varying formats. Memory card 14 represents generally any form of memory on which digital images can be stored for later retrieval. Typically memory card 14 is inserted into digital camera 12. As digital camera 12 captures images, digital representations of those images are stored on the inserted memory card 14. Memory card 14 can then be removed from digital camera 12 and connected to another device capable of retrieving the digital images from the memory card 14.

Alternatively, the digital images may be retrieved by a device connected directly to the digital camera 12. For example, MFD 16 may include an interface such as a host USB (Universal Serial Bus) that can be connected directly to digital camera 12. Similarly, digital camera 12 may be received into a docking station that is in turn connected to an interface of MFD 16. MFD 16 may then access images from camera 12 through a CIFS (Common Internet File System) server incorporated into the docking station.

While the name "memory card" may infer an integrated circuit such as a compact flash card, smart media card, or memory stick, memory card 14 also encompasses optical and magnetic media such as compact and floppy discs. MFD 16 represents generally any multiple function device capable of functioning as a printer and a scanner. MFD 16 is also capable of reading and writing data to memory card 14.

As illustrated, link 22 interconnects MFD 16, with desktop computer 18 and server 20. Link 22 represents generally any cable, wireless, or remote connection via a telecommunication link, an infrared link, a radio frequency link, or any other connector or system that provides electronic communication between components 16, 18, and 20. Link 22 may represent an intranet, the Internet, or a combination of both. Link 22 may also interconnect MFD 16 with digital camera 12 allowing MFD 16 to acquire digital images from memory card 14 when card 14 is inserted into digital camera 12.

Figure 2:
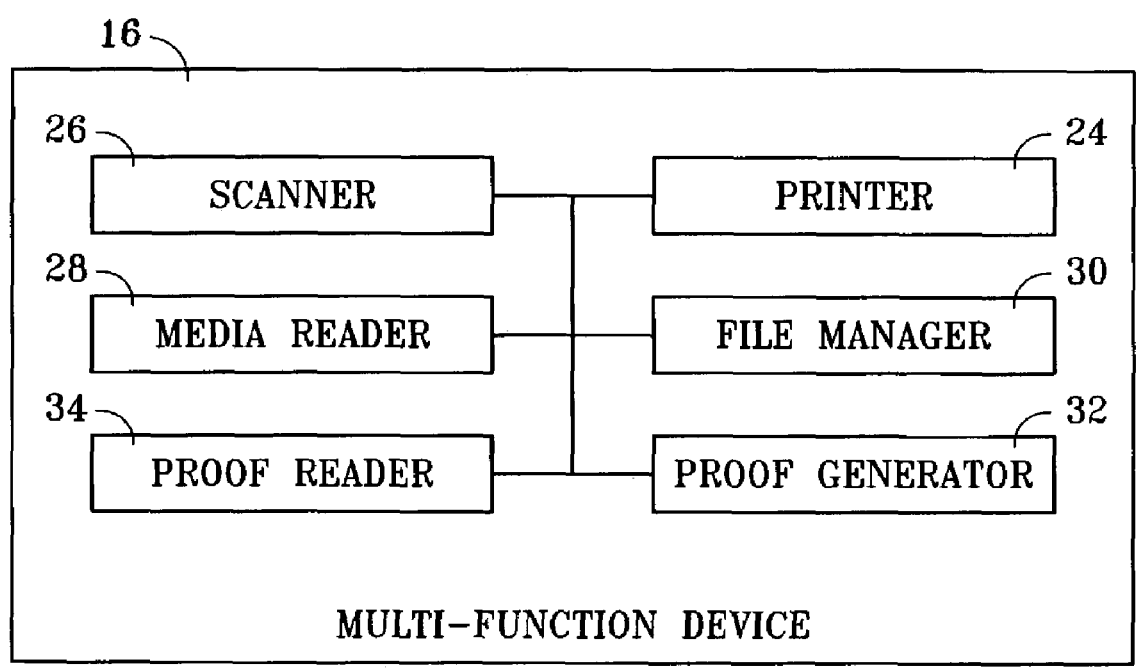
FIG. 2 is block diagram showing the logical hardware and programming elements of a multifunction device according to an embodiment of the present invention.

COMPONENTS: It is expected that various embodiments of the present invention will be performed by and/or incorporated into a multifunction device that is capable of functioning as a printer and a scanner. FIG. 2 is a block diagram illustrating the various hardware and programming elements of such a multi-function device (MFD 16). MFD 16 includes printer 24, scanner 26, media reader 28, file manager 30, proof generator 32, and proof reader 34. Printer 24 represents any combination of hardware and programming capable of producing a physical image on a sheet of paper or other print media. Scanner 26 represents any combination of hardware and programming capable reading text or illustrations printed on paper or another physical media and translating the information into a computer readable form. In other words—scanner 26 is capable of digitizing a printed image. Media reader 28 represents any combination of hardware and programming capable of reading electronic data stored on a memory card. In the case where the camera is connected to an interface incorporated into MFD 16, the media reader 28 may take the form of programming capable of accessing the memory card 14 in the digital camera 12 as a mass storage device over a USB connection. Or, media reader may be a CIFS server contained in a docking station connected to MFD 16.

File manger 30 represents generally any programming capable of electronically managing and deleting digital images on a media card or elsewhere. Common managing functions include copying, moving, renaming, and deleting. Other managing functions include publishing to a web site and transferring via electronic mail. Managing can also include manipulating, for example, creating a thumbnail of a digital image. A thumbnail is a replica that has a lower resolution than an original digital image.

Proof generator 32 represents any programming capable of creating a proof sheet of digital images stored on a memory card 14 and to direct printer 24 to print the proof sheet. A proof sheet is a document that when printed includes one or more icons each representing an image identified on memory card 14. An icon may take the form of a thumbnail. A thumbnail is a low resolution replica that when printed provides a visual preview of a given digital image. The proof sheet also includes one or more selectors that when marked by a user indicate that one or more digital images are to be printed, managed, and/or deleted. A selector may be a bubble, check box, or any other user identifiable symbol or demarcation on the printed proof sheet that a user may mark. Marking a selector may involve using a writing utensil such as a pen or pencil or any other implement that can alter the selector so that when scanned, the digitized rendition of a marked proof sheet differs from a digitized rendition of an unmarked proof sheet.

Proof reader 34 represents generally any programming capable of identifying a user's marks from a digitized version of a marked proof sheet. Proof reader 34 is also responsible for directing the actions of file manager 30 and printer 24 in a manner determined by the user's marks. An example of a proof sheet will be discussed below with reference to FIG. 4.

As an alternative, scanner 26 and proof reader 34 may implemented using existing hardware in an inkjet printer. The user would place the marked up proof sheet in the paper tray, as for printing. The printer would pick and advance the paper as if to print. A sensor on the print carriage (normally used for paper type and edge detection) scans the page. As the proof sheet advances, the carriage (and sensor) are scanned back and forth across the proof sheet and advancing the paper allowing the sensor to scan the entire proof sheet.

While it is expected that the printing, scanning, media reading, file managing, proof generating, and proof reading functions described above will be performed by a single device such as MFD 16, those functions may instead be provided by two or more devices. For example, file manager 30, proof generator 32, and proof reader 34 may be programs running on desktop computer 18 and/or server 20. Printer 24 and scanner 26 may be unique devices interconnected by link 22.

The block diagram of FIG. 2 shows the architecture of one implementation of the present invention. Where the function (s) of a block are performed by programming and that programming is embodied in software, that block may, at least in part, represent a module, segment, or portion of code that comprises one or more executable instructions to implement the specified logical function(s). If the programming is embodied in hardware, each block may represent or include a circuit or a number of interconnected circuits to implement the specified logical function(s).

The present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain programming for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as a floppy diskette or hard drive, a random access memory (RAM), a read-only memory (ROM), an erasable programmable read-only memory, or a portable compact disc.

Figure 3:
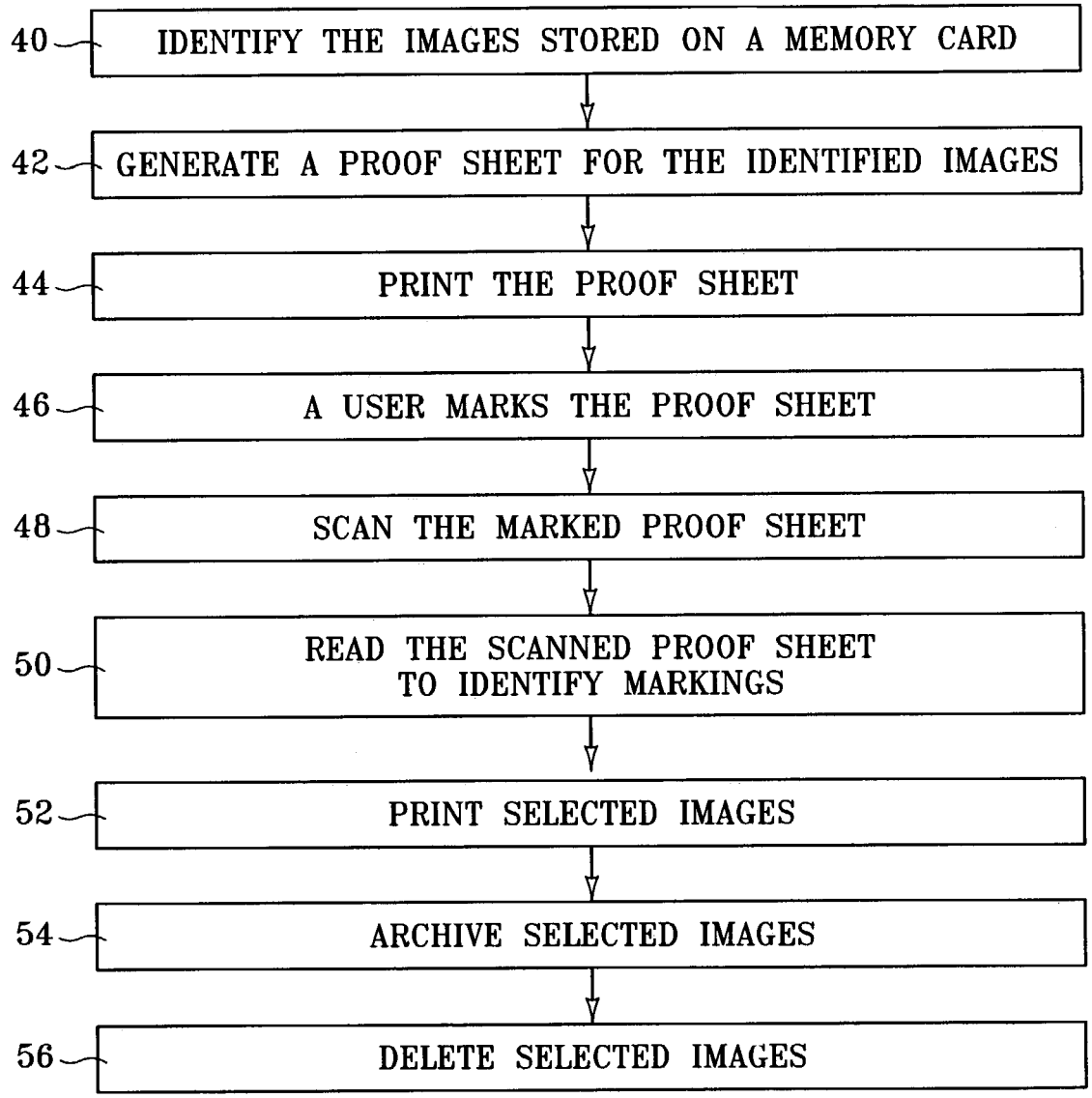
FIG. 3 is a flow diagram illustrating a method embodiment of the present invention.

OPERATION: FIG. 3 is a flow chart illustrating steps taken to perform a method embodiment of the present invention. The following description of those steps is made with reference to the components of MFD 16 shown in FIG. 2 and environment 10 of FIG. 1. First it is assumed that digital camera 12 has captured a number of images on memory card 14, and memory card 14 has been inserted into media reader 28 of MFD 16. Utilizing file manager 30, proof generator 32 identifies the images stored on memory card 14 (step 40). Proof generator 32 generates a proof sheet for the images identified in step 40 (step 42) and directs printer 24 to print the proof sheet (step 44).

The printed proof sheet includes selectors that when marked by a user indicate that one or more particular images are to be acted upon. Acting upon a particular digital image may involve printing, managing, or deleting a digital image. A user then examines and marks the printed proof sheet as desired (step 46). With the user's assistance, scanner 26 scans the marked proof sheet (step 48). Proof reader 34 reads the scanned and digitized rendition of the marked proof sheet to identify the selectors marked by the user (step 50). Noting the marked selectors, proof reader 34 directs printer 24 to print any selected images (step 52). Proof reader 34 directs file manager 30 to manage any selected images (step 54). Proof reader 34, then, directs file manager 30 to delete any selected images from memory card 14 (step 56).

Managing may include copying or moving a digital image from memory card 14 to a particular location such as an archive directory on desktop computer 18 or server 20 or removable medium such as CD-R, CD-RW, DVD, jazz, zip, or an external hard drive. Ideally, a printed proof sheet will, for each image identified in step 40, include one or more selectors allowing a user to instruct that the particular digital image be copied or moved to one or more specified archive directories.

Managing can also include publishing a digital image on a web site or e-mailing the digital image to one or more selected recipients. The e-mail may include the actual image itself, a thumbnail of the image, and/or a link to a website with the full image. Managing may also include sending a digital image to a digital picture frame. A digital picture frames that appear like a traditional frame but display a digital image on an liquid crystal or plasma screen. The digital frame includes a memory for holding a digital image, an interface through which it can receive a digital image from another device, and a processing system capable of displaying a stored digital image on the screen. The frame's memory may be capable of storing multiple digital images, and the frame's processing system may be capable of periodically changing the display from one digital image to another. A digital picture frame may be treated as an archive directory.

If the MFD has no direct connection to the Internet, the programming responsible for publishing and e-mailing will likely be located on desktop computer 18 and/or server 20. If the MFD has a direct connection to the Internet, the programming responsible for publishing and e-mailing can either be in the MFD 16, on the desktop computer 18, or on the server 20.

Although the flow chart of FIG. 3 shows a specific order of execution, the order of execution may differ from that which is depicted. For example, the order of execution of two or more blocks may be scrambled relative to the order shown. Also, two or more blocks shown in succession in FIG. 3 may be executed concurrently or with partial concurrence. All such variations are within the scope of the present invention.

EXAMPLE: FIG. 4 illustrates an example of a proof sheet 60. Proof sheet 60 includes sections 62-68 with each section 62-68 representing a step. Step one involves individually identifying digital images to be printed, managed, and/or deleted. Step two involves specifying options for printing the selected digital images. Step three involves specifying options for managing and deleting. Step four merely provides written instruction for a user on how to scan the proof sheet once it has been marked. The order of steps 1-3 may be rearranged. All variations are within the scope of this invention. The proof sheet may span several pages. The image icons and selectors may be on different pages or in different sections than shown on the example.

Section 62 represents step one and includes thumbnails 70 of digital images identified on memory card 14. Section 62 also includes, for each thumbnail 70, selectors 72 and 74 associated with that thumbnail 70. Selector 72, when marked, indicates that the digital image represented by thumbnail 70 is to be printed. Indicators 74, when marked, specify that the digital image represented by thumbnail 70 is to be managed by saving the digital image to directory one (DIR 1) or to directory two (DIR 2).

Section 64 represents step two and includes selectors 76-82 associated with all thumbnails in section 62. Selectors 76, when marked, indicate that digital images selected in section 62 should be printed once or twice. Selectors 78 are used to specify the size of each printed image. Selectors 80 are used to specify the size of paper to use when printing selected digital images. Selectors 82 are used to specify a border to use when printing selected images. Other selectors could be added for other relevant printing options and are within the scope of this invention.

Section 66 represents step three and includes selectors 84 and 86 associated with all thumbnails 70 in section 62. Selector 84, when marked, indicates that the digital images on a memory card are to be deleted once printed and/or managed. Selectors 86 are used to specify the identity of directories one and two—the two directories to which digital images can be saved using selectors 74. As shown in section 66, directories one and two can be selected from a list of three possible directories. The number of directories in that list can be increased or decreased. Selectors 86 can also be used to specify that all images are to be saved to directory one and/or directory two. While not shown, section 66 may also include selectors used to indicate that one or more digital images are to be published to a web site and/or e-mailed. Such an e-mail may include the digital image, a thumbnail of the image, or a network address such as an URL (Uniform Resource Locator) that can be used to view the image.

Proof sheet 60 also includes alignment markers 88 and 90. When proof sheet 60 is digitized, proof reader 34 can identify the location of each alignment marker 88 and 90. Once identified, proof reader 34 can identify the coordinates of one alignment marker 88 or 90 relative to the other. Using those coordinates, proof reader 34 can calculate the relative location of selectors 72-86 to determine which of those selectors have been marked.

The present invention has been shown and described with reference to the foregoing exemplary embodiments. It is to be understood, however, that other forms, details, and embodiments may be made without departing from the spirit and scope of the invention, which is defined in the following claims.

What is claimed is:

1. A printed proof sheet for selecting digital images to be managed, comprising:

for each digital image, a representation of that digital image; for each representation, one or more first selectors associated with that representation, the one or more selectors when marked indicate that the digital image represented by that representation is to be managed in a first specified manner; and one ore more second selectors each associated a plurality of the representations, each second selector when marked indicating that all of the digital images represented by the plurality of representations are to be managed in a second specified manner;

wherein one or more of the one or more first and second selectors, when marked, indicate that the associated represented digital image or images are to be managed in a manner that includes one or more of copying or moving the digital image or images to one or more selected archive directories, publishing the digital image or images to a web site, or transmitting the digital image or images via electronic mail to one or more recipients.

2. The sheet of claim 1, wherein one or more of the one or more first and second selectors, when marked, indicate that the associated represented digital image or images are to be deleted.

3. A method, comprising identifying digital images, and generating and printing a scannable proof sheet having a plurality of first selectors, each first selector when marked indicating that a particular one of the identified digital images is to be managed in a first specified manner, the scannable proof sheet also having a plurality of second selectors, each second selector when marked indicating that all of the identified digital images are to be managed in a second specified manner;

wherein one or more of the one or more first and second selectors, when marked, indicate that the associated represented digital image or images are to be managed in a manner that includes one or more of copying or moving the digital image or images to one or more selected archive directories, publishing the digital image or images to a web site, and transmitting the digital image or images via electronic mail to one or more recipients.

4. The method of claim 3, wherein one or more of the one or more first and second selectors, when marked, indicate that the associated represented digital image or images are to be generating and printing includes generating and printing a proof sheet with one or more first and second selectors that when marked indicate that a selected one or all of the identified digital images are to be deleted.

5. A method comprising: identifying digital images; generating and printing a proof sheet having a plurality of first selectors, each first selector when marked indicating that a particular one of the identified digital images is to be managed in a first specified manner, the proof sheet also having a plurality of second selectors, each second selector when marked indicating that all of the identified digital images are to be managed in a second specified manner;
   digitizing the printed proof sheet once one or more selectors have been marked;
   reading the digitized proof sheet to identify marked selectors; and
   managing one or more of the digital images according to the identified marked selectors;
   wherein managing in the second specified manner includes one or more of copying or moving a digital image to one or more archive directories, publishing a digital image to a web site, and e-mailing a digital image to one or more recipients.

6. The method of claim 5, wherein e-mailing comprises e-mailing a thumbnail of a digital image to one or more recipients.

7. The method of claim 5, wherein managing in the second specified manner further includes publishing a digital image to a web site and e-mailing to one or more recipients a network address for accessing the web site.

8. A method, comprising identifying digital images; generating and printing a proof sheet that includes, for each identified digital image, one or more first selectors associated with that digital image, the associated first selectors when marked, indicate that the associated digital image is to be printed, managed in a first specified manner, or deleted, the proof sheet also includes one or more second selectors each associated with all of the identified digital images, wherein one or more of the second selectors when marked indicate print options, one or more second selectors when marked indicate that all of the identified digital images are to be managed in a second specified manner, and one or more of the second selectors when marked indicate that all of the identified digital images are to be deleted;
   digitizing the printed proof sheet once one or more selectors have been marked;
   reading the digitized proof sheet to identify marked first and second selectors;
   printing each digital image, if any, that is associated with a marked selector indicating that the digital image is to be printed;
   managing each digital image, if any, that is associated with a marked selector indicating that the digital image is to be managed, wherein managing each digital image includes one or more of copying or moving a digital image to one or more archive directories, publishing a digital image to a web site, and e-mailing a digital image to one or more recipients; and
   deleting each digital image, if any, that is associated with a marked selector indicating that the digital image is to be deleted.

9. Computer readable media having computer executable instructions for identifying digital images, and generating a scannable proof sheet having a plurality of first selectors, each first selector when marked indicating that a particular one of the identified digital images is to be managed in a specified manner, the scannable proof sheet also having a plurality of second selectors, each second selector when marked indicating that all of the identified digital images are to be managed in a second specified manner, wherein one or more first and second selectors, when marked, indicate that a selected one or all of the identified digital images are to be managed in a manner that includes one or more of:
   copying or moving the digital image or images to one or more selected archive directories;
   publishing a selected one or all of the identified digital images to a web site; and
   transmitting a selected one or all of the identified digital images via electronic mail to one or more recipients.

10. Computer readable media having computer executable instructions for:
   identifying digital images; generating a proof sheet having a plurality of first selectors, each first selector when marked indicating that a particular one of the identified digital images is to be managed in a first specified manner, the scannable proof sheet also having a plurality of second selectors, each second selector when marked indicating that all of the identified digital images are to be managed in a second specified manner;
   digitizing the proof sheet after the proof sheet has been printed and one or more selectors have been marked;
   reading the digitized proof sheet to identify marked selectors; and
   managing one or more of the digital images according to the identified marked selectors;
   wherein the instructions for managing include instructions for managing in a manner that includes instructions for one or more of:
   copying or moving one or more of the digital images to one or more selected archive directories;
   publishing one or more of the digital images to a web site; and
   transmitting one or more of the digital images via electronic mail to one or more recipients.

11. The media of claim 10, wherein the instructions for e-mailing comprise instructions for e-mailing a thumbnail of a digital image to one or more recipients.

12. The media of claim 10, wherein the instructions for managing include instructions—for publishing one or more of the digital images to a web site and e-mailing to one or more recipients a network address for accessing the web site.

13. Computer readable media having computer executable instructions for:
   identifying digital images; generating a proof sheet that includes, for each identified digital image, one or more first selectors associated with that digital image, the associated first selectors when marked, indicate that the associated digital image is to be printed, managed in a first specified manner, or deleted, the proof sheet also includes one ore more second selectors each associated with all of the identified digital images, wherein one or more of the second selectors when marked indicate print options, one or more second selectors when marked indicate that all of the identified digital images are to be managed in a second specified manner, and one or more of the second selectors when marked indicate that all of the identified digital images are to be deleted;
   digitizing the printed proof sheet once one or more selectors have been marked;
   reading the digitized proof sheet to identify marked first and second selectors;
   reading the digitized proof sheet to identify marked selectors;

printing each digital image, if any, that is associated with a marked selector indicating that the digital image is to be printed;

managing each digital image, if any, that is associated with a marked selector indicating that the digital image is to be managed, wherein managing each digital image includes one or more of copying or moving a digital image to one or more archive directories, publishing a digital image to a web site, and e-mailing a digital image to one or more recipients; and deleting each digital image, if any, that is associated with a marked selector indicating that the digital image is to be deleted.

14. A system, comprising: a proof generator operable to identify digital images and generate a proof sheet having a plurality of first selectors, each first selector when marked indicating that a particular one of the identified digital images is to be managed in a first specified manner, the proof sheet also having a plurality of second selectors, each second selector when marked indicating that all of the identified digital images are to be managed in a second specified manner; and a proof reader operable to read the digitized proof sheet having one or more marked first and second selectors, to identify the marked selectors, and to instruct that one or more of the digital images be managed according to the identified marked selectors;

wherein the proof reader is operable to instruct that the one or more digital images are to be managed in a manner that includes one or more of:

copying or moving one or more of the digital images to one or more selected archive directories;

publishing one or more of the digital images to a web site; and transmitting one or more of the digital images via electronic mail to one or more recipients.

15. The system of claim 14, further comprising a printer operable to print a generated proof sheet and a scanner operable to digitize a printed proof sheet having one or more marked first and second selectors.

16. The system of claim 15 wherein the proof reader is operable to instruct the printer to print one or more of the digital images.

17. The system of claim 14 further comprising a file manager, and wherein the proof reader is operable to instruct the file manager to manage one or more of the digital images.

18. A system, comprising: a proof generator operable to identify digital images and generate a proof sheet having a plurality of first selectors, each first selector when marked indicating that a particular one of the identified digital images is to be managed in a first specified manner, the proof sheet also having a plurality of second selectors, each second selector when marked indicating that all of the identified digital images are to be managed in a second specified manner; a printer operable to print a proof sheet;

a scanner operable to digitize a printed proof sheet having one or more marked selectors; and a proof reader operable to read the digitized proof sheet having one or more marked selectors, to identify the marked selectors, and to instruct that one or more of the digital images be managed according to the identified marked selectors;

wherein the proof reader is operable to instruct that the one or more digital images are to be managed in a manner that includes one or more of:

copying or moving one or more of the digital images to one or more selected archive directories;

publishing one or more of the digital images to a web site; and transmitting one or more of the digital images via electronic mail to one or more recipients.

19. The system of claim 18 further comprising a file manager and wherein the proof generator is operable to instruct the file manager to manage one or more of the digital images.

20. The system of claim 18, wherein the proof generator is operable to instruct the printer to print one or more of the digital images.

21. A system comprising: a means for identifying digital images a means for generating a proof sheet having a plurality of first selectors, each first selector when marked indicating that a particular one of the identified digital images is to be managed in a first specified manner, the proof sheet also having a plurality of second selectors, each second selector when marked indicating that all of the identified digital images are to be managed in a second specified manner;

a means for printing a proof sheet;

a means for digitizing a printed proof sheet having one or more marked selectors;

a means for reading a digitized proof sheet having one or more marked selectors to identify the marked selectors, a means for managing one or more of the digital images according to the identified marked selectors;

a means for printing one or more of the digital images according to the identified marked selectors; and wherein the means for managing is operable manacled one or more of the digital images in a manner that includes one or more of;

copying or moving one or more of the digital images to one or more selected archive directories:

publishing one or more of the digital images to a web site; and transmitting one or more of the digital images via electronic mail to one or more recipients.

\* \* \* \* \*

UNITED STATES PATENT AND TRADEMARK OFFICE
CERTIFICATE OF CORRECTION

PATENT NO. : 7,315,391 B2  Page 1 of 1
APPLICATION NO. : 10/350419
DATED : January 1, 2008
INVENTOR(S) : Brad Nakano et al.

It is certified that error appears in the above-identified patent and that said Letters Patent is hereby corrected as shown below:

In column 6, line 27, in Claim 1, delete "ore" and insert -- or --, therefor.

In column 10, line 46, in Claim 21, delete "of;" and insert -- of: --, therefor.

In column 10, line 48, in Claim 21, delete "directories:" and insert -- directories; --, therefor.

Signed and Sealed this

Third Day of June, 2008

JON W. DUDAS
*Director of the United States Patent and Trademark Office*